(12) United States Patent  
Krasnobaev

(10) Patent No.: US 11,796,431 B2  
(45) Date of Patent: Oct. 24, 2023

(54) THERMAL DESORPTION TUBE FOR PORTABLE, BATTERY-POWERED FIELD ANALYZER OR LINE-POWERED ANALYZER

(71) Applicant: Leonid Krasnobaev, Framingham, MA (US)

(72) Inventor: Leonid Krasnobaev, Framingham, MA (US)

( * ) Notice: Subject to any disclaimer, the term of this patent is extended or adjusted under 35 U.S.C. 154(b) by 573 days.

(21) Appl. No.: 17/029,144

(22) Filed: Sep. 23, 2020

(65) Prior Publication Data

US 2021/0088425 A1    Mar. 25, 2021

Related U.S. Application Data

(60) Provisional application No. 62/905,322, filed on Sep. 24, 2019.

(51) Int. Cl.
| | |
|---|---|
| *G01N 1/40* | (2006.01) |
| *G01N 1/22* | (2006.01) |
| *G01N 30/02* | (2006.01) |
| G01N 30/00 | (2006.01) |
| G01N 30/12 | (2006.01) |

(52) U.S. Cl.
CPC ........... *G01N 1/405* (2013.01); *G01N 1/2214* (2013.01); *G01N 30/02* (2013.01); *G01N 2030/0095* (2013.01); *G01N 2030/025* (2013.01); *G01N 2030/128* (2013.01); *Y10T 436/255* (2015.01)

(58) Field of Classification Search
CPC ...... G01N 1/22; G01N 1/2214; G01N 1/2247; G01N 1/405; G01N 30/012; G01N 30/12; G01N 2030/025; G01N 2030/0095; G01N 2030/128; Y10T 436/25; Y10T 436/255; Y10T 436/25875
USPC ...... 436/63, 147, 174, 178, 181; 422/69, 84, 422/88, 89, 527
See application file for complete search history.

(56) References Cited

U.S. PATENT DOCUMENTS

| | | | |
|---|---|---|---|
| 5,142,143 A | 8/1992 | Fite et al. | |
| 6,656,738 B1 * | 12/2003 | Vogel | ....... G01N 1/40 422/89 |
| 7,282,676 B1 | 10/2007 | Bouchier et al. | |
| 7,430,928 B2 * | 10/2008 | Grate | ....... G01N 1/2214 73/863.21 |

(Continued)

FOREIGN PATENT DOCUMENTS

WO    2005001426 A2    1/2005

*Primary Examiner* — Maureen Wallenhorst
(74) *Attorney, Agent, or Firm* — Hayes Soloway PC

(57) ABSTRACT

A thermal desorption tube for use with an electrical power source that includes a tube body having a tube middle portion, a gas inlet, and a gas outlet, a heating element having a first element end and a second element end, wherein the heating element is disposed within the tube body between the gas inlet and the gas outlet, wherein the heating element has a Temperature Coefficient of Resistance (TCR) value greater than 0.003 per degree Celsius, and wherein the first element end and the second element end are configured to electrically couple to a power source, and a sorbent material disposed within the tube middle portion, wherein the sorbent material is disposed in and occupies all available space within the tube middle portion surrounding, within, and adjacent the heating element, and wherein the sorbent material is in direct contact with the heating element.

20 Claims, 19 Drawing Sheets

(56) References Cited

U.S. PATENT DOCUMENTS

| | | | |
|---|---|---|---|
| 7,449,050 B2* | 11/2008 | Wohltjen | B01D 53/0407 436/178 |
| 8,409,510 B2 | 4/2013 | McGill et al. | |
| 8,784,737 B2 | 7/2014 | Rafferty et al. | |
| 9,451,364 B2* | 9/2016 | Rafferty | G01N 33/0011 |
| 9,599,547 B2 | 3/2017 | Rafferty et al. | |
| 9,733,225 B2* | 8/2017 | Armstrong | G01N 33/0016 |
| 9,816,902 B2* | 11/2017 | Weling | G01N 1/405 |
| 9,978,574 B2 | 5/2018 | Brown et al. | |
| 10,466,149 B2* | 11/2019 | Weling | G01N 1/405 |
| 10,605,791 B2 | 3/2020 | Bourlon et al. | |
| 2004/0129057 A1 | 7/2004 | Bonne et al. | |
| 2006/0258017 A1* | 11/2006 | Gullett | G01N 1/2205 436/178 |
| 2008/0148815 A1 | 6/2008 | Lucas et al. | |

\* cited by examiner

THERMAL DESORPTION TUBE FOR PORTABLE, BATTERY-POWERED FIELD ANALYZER OR LINE-POWERED ANALYZER

BACKGROUND OF THE INVENTION

1. Field of the Invention

The present invention relates generally to the field of chemical analysis and detection. Particularly, the present invention relates to the use of a sample collection and introduction system that utilizes adsorption, thermal desorption to increase the concentration of a sample introduced to a chemical analyzer.

2. Description of the Prior Art

Thermal desorption tube used for chemicals in air collection usually consists of 0.05-0.2 g of sorbent material in a mesh form packed inside of 3.5-inch-long glass or stainless-steel tube with 0.25-inch OD. To collect a chemical compound, an air pump is connected to one side of the thermal desorption tube. Air is pumped through the tube, and chemical compounds are collected by the sorbent material. After sample collection, both sides of the tube are sealed with caps, and the tube is stored and transported to a chemical lab for analysis. In the lab, the thermal desorption tube is placed in an AC-powered oven, called a thermal desorber, and heated for a few minutes. Chemical compounds desorbed from the sorbent material are injected into a second stage concentrator, called a focusing trap or a cryotrap, and followed by flash desorption into a chemical analyzer: Gas Chromatograph (GC), Mass Spectrometer (MS), GC/MS or GC/FT/IR.

Sorbent materials commonly used for trapping volatile organics include porous resin, silica gel, activated charcoal, graphitized carbon black, and carbon molecular sieves. One of the widely used sorbent materials is Tenax. Tenax is a porous polymer resin based on 2,6-diphenylene oxide. It is hydrophobic and has a low affinity for water. To avoid oxidation and degradation, Tenax should not be heated in air to temperatures above 250° C. There are two grades of Tenax: Tenax TA and Tenax GC. The former is of higher purity and is preferred for trace analysis. Silica gel is a stronger sorbent than Tenax. It is hydrophilic and therefore an excellent material for trapping polar compounds. However, water is also retained. Charcoal is another sorbent that is stronger than Tenax. It is rather hydrophobic and is used mainly to trap very volatile compounds (such as dichlorodifluoromethane, a.k.a Freon 12) that can break through Tenax and silica gel. Conventional traps usually contain Tenax, silica gel, and charcoal in series.

Most of the sorbent materials used in thermal desorption tubes and pre-concentrators will be affected by overheating. Precision temperature control of a thermal desorption tube during sample release is important for quantitative chemical analysis to get repeatable results. Lack of temperature control can be accompanied by a non-controlled sample desorption rate and, in the case of overheating, with sample decomposition.

Currently used laboratory thermal desorbers are AC-powered and have a relatively large mass heater block (see FIG. 1) heated to a target temperature. The thermal desorption tube is placed into the heater block and connected on one end to the GC carrier gas flow line and on the other end of the tube to the GC sampling port.

Usually, a thermal desorber desorbs collected chemicals at temperatures from 70° C. to 300° C. either isothermally or following a temperature program ramp rates up to 40° C./min. In some thermal desorbers, the rapid heating of samples can be done at rates up to 200° C./min. FIG. 2 shows thermal desorption tube temperature after placing in a thermal desorber oven heated to 250° C. as a function of time. It takes approximately 90 seconds to heat the tube to 250° C. with a power consumption of 400 W.

To address the power consumption issue, some field-deployable chemical analyzers employ devices called pre-concentrators instead of using thermal desorption tubes. Pre-concentrators have a much smaller amount of sorbent materials and are used in a battery-powering configuration. Also, most of the pre-concentrators use adsorbent material directly attached, deposited, or adhered to a miniature heater. As a result, pre-concentrators' performance in chemicals from air collection is limited by the use of a smaller mass of the only specific adsorbent material.

A pre-concentrator design should comply with two contradictory requirements. First, the sorbent material should be heated fast enough to address the limited power available from a battery and to prevent heat dissipation and to prevent collected sample loss. Second, the sorbent material should be heated to a particular specified temperature and no higher. Sorbent material overheating causes sorbent degradation and sample decomposition.

A common way to heat sorbent material 4 with an electrical resistive heater is to place a resistive wire heater 6 outside of the container 8 (glass or stainless-steel tube) with sorbent as illustrated in FIG. 3. In this case, the applied electrical power heats the resistive wire 6. Thermal flux from the resistive wire 6 should overcome the thermal resistance of the glass or stainless-steel tube of the container 8 before it goes to the sorbent material 4. Such arrangement requires much higher power consumption than when the resistive heater wire is placed inside the container 8 in direct contact with the sorbent material 4.

To control heat power, a thermocouple 9 is positioned in the vicinity of the heater, or a resistance value of the heater wire is measured. The resistance value of the heater is a function of the temperature.

Such an arrangement has a major disadvantage: the temperature of the sorbent material 4 is different from the temperature of the heater 6. As a result, it is impossible to heat the sorbent material with a high ramp rate and avoid sorbent overheating.

In the above-described pre-concentrator, the heater element wire 6 is separated from the sorbent material 4 with a thermal insulator 8. When the pre-concentrator temperature is controlled by a thermocouple 9 having no direct thermal contact with sorbent material 4, the temperature of the heating element can easily exceed the maximum temperature specified for the sorbent material 4 operation. As a result, during fast heating, it is hard to avoid sorbent material overheating and sorbent material damage.

U.S. Pat. No. 9,451,364 describes a pre-concentrator tube with a temperature control element (heater), in which the temperature sensor has a temperature sense terminal to communicate a sensed temperature, a temperature control unit coupled to the temperature control element and configured to supply a current to the temperature control element. The same patent describes that "The tubing is typically wrapped in Nichrome wire which heats the tubing when an electrical current is passed through it."

Use of a heater wire element resistance as a temperature sensor is another known solution. FIG. 4 illustrates U.S. Pat.

No. 8,784,737 (the '737 patent), which teaches heater element placement inside of the thermal desorption tube and temperature sensing is based on a known and predictable correlation between the temperature and the resistance of the conductive material. The authors of the '737 patent mentioned Nichrome as a heating element material. Also, in the '737 patent, the sorbent material is permanently attached to the heater.

However, such an arrangement cannot provide the required precision and repeatability in temperature control if used with Nichrome wire as described in the '737 patent. Commonly used Nichrome wire has a resistivity of $1.10 \times 10^{-6}$ Ohm*m at 20° C. and a Temperature Coefficient of Resistance (TCR), which is the calculation of a relative change of resistance per degree of temperature change, of 0.0004 (1/° C.), or 0.04% per 1/° C. An element fabricated from Nichrome wire and having, for example, 2Ω resistance at 100° C., the same nichrome wire will have a resistance of 2.0008Ω at 110° C., which corresponds to 0.8 mΩ resistance increase for 10° C. increase. Such small resistance change makes precision temperature control in a field-deployable portable device impractical.

For example, a 12-bit Analog-to-Digital Converter ("ADC") has a resolution of one part in 4,096, where $2^{12}=4,096$. Thus, a 12-bit ADC with a maximum input of 10 VDC can resolve the measurement into 10 VDC/4096=0.00244 VDC=2.44 mV.

FIG. 5 is a graphical representation of the heater wire temperature computation. The electrical current $I_m$ through the heater wire is measured by voltage drop $V_m$ on the resistor $R_m$ having known resistance value. The heater resistance $R_h$ is continuously monitored by measurement of $V_h$ and calculated as $V_h/I_m$ ratio. The knowledge of the heater resistance $R_h$ and TCR of the heater wire material makes it possible to calculate and to monitor heater temperature value. To avoid temperature change on the resistor $R_m$ used for electrical current measurement, the resistance should be in the mOhm range, let's say 5 mOhm. A 2.5-A current through a resistance of 5 mOhm will provide a voltage drop $V_m$ of 0.0125 V (0.005×2.5=0.0125 V), or 5 bits. A 10° C. degree heating of a 5-Ohm resistor will be accompanied by resistance change with a TCR 0.0004 (1/° C.) equal to 2 mOhm, and a $V_h$ change of 10 V×0.0004=0.004V=4 mV, or 1.6 bits.

For the portable battery-powered instruments, a 12-bit ADC usually has the typical ENOB (effective number of bits) of 10.5, which means a resolution of $2^{10.5}=1448$. So, the device resolution in voltage measurement $V_m$ is 6.9 mV, and a 10° C. degree change will be accompanied by 4 mV/6.9 mV=0.6 bit value, which is not high enough for precision temperature control and monitoring.

SUMMARY OF THE INVENTION

It is an object of the present invention to provide a thermal desorption tube that can provide fast temperature increase to the set value in a short period of time.

It is another object of the present invention to provide a thermal desorption tube that can be used with a battery-powered field analyzer.

It is a further object of the present invention to provide a thermal desorption tube that can be heated within a few seconds to the required temperature.

It is yet another object of the present invention to provide a thermal desorption tube for fast, energy-efficient heating of a sorbent material and which avoids sorbent material overheating.

The present invention achieves these and other objectives by providing a thermal desorption tube with embedded heating element for use with a battery power source for in-the-field use where the sorbent material can be heated by battery power to the required temperature just within a few seconds with a ramp rate of 40° C./sec or so. The heating element is constructed from a metal with a high TCR value. The temperature of the heating element is monitored by measuring the electrical current ($I_m$) through the heating element and a voltage drop ($V_h$) through the heating element. Those two parameters allow calculation of the element resistance, $R_h=V_h/I_m$, which is a function of the element temperature $R_h=F(T)$. Such direct measurement of the element temperature makes it possible to precisely maintain heating element temperature and sorbent material temperature. The above-described design provides fast, energy-efficient heating of sorbent material and avoids sorbent material overheating. The latter is very important because sorbent material overheating can be accompanied with sorbent material degradation and collected sample loss.

In one embodiment, the thermal desorption tube comprises a tube body having a tube wall, a tube first end portion, a tube second end portion, a tube middle portion, a gas inlet, and a gas outlet, a heating element having a first element end and a second element end where the heating element is disposed within the tube body between the gas inlet and the gas outlet, where a space is defined between the heating element and the tube body, where the heating element has a TCR value greater than 0.003 per degree Celsius, and where the first element end and the second element end are configured to electrically couple to a power source, and a sorbent material disposed within the tube middle portion where the sorbent material is disposed and occupies all available space within the tube middle portion surrounding, within, and adjacent the healing element and where the sorbent material is in direct contact with the heating element.

In one embodiment, the present invention further comprises a plug 70 disposed inside the tube first end portion and the tube second end portion adjacent the gas inlet and the gas outlet, respectively, around heater element ends 52 and 54, and adjacent portions of heater element 50.

In one embodiment, the tube middle portion is made of an electrically-insulating material, where the tube first end portion and the tube second end portion are made of an electrically-conducting material and where the first element end is electrically coupled to the tube first end portion and the second element end is electrically coupled to the tube second end portion.

In one embodiment, the tube body is entirely made of an electrically-insulating material, wherein the first element end extends through the tube first end portion and the second element end extends through the tube second end portion.

In one embodiment, the tube body is entirely made of an electrically-conducting material, wherein the first element end and the second element end each extend through a non-electrically conductive feedthrough disposed in the wall of the tube body.

In one embodiment, the tube body is entirely made of an electrically-conducting material, wherein the first element end extends through a non-electrically conductive feedthrough disposed in the wall of the tube body and the second element end is electrically coupled to the tube body.

In one embodiment, the thermal desorption tube further comprises an air blower adjacent to the tube middle portion and positioned to deliver an air flux across the tube middle portion for efficiently cooling the post heated tube body.

In one embodiment, the thermal desorption tube further comprises a thermoelectric cooler positioned within the flow of the air flux between the air blower and the tube middle portion.

In one embodiment, the electrically-insulating material is made of glass, quartz, or ceramics, wherein the glass is a borosilicate glass or a soda lime glass.

In one embodiment, the electrically-conducting material is made of a metal such as copper, nickel-cobalt ferrous alloy, or stainless steel.

In one embodiment, the thermal desorption tube further comprises a spring-loaded contact for connecting the heater element to the battery power source.

In one embodiment, the thermal desorption tube further comprises a calibrant source containing a known concentration of a calibrant chemical removably coupled to the gas inlet of the thermal desorption tube.

In one embodiment, the thermal desorption tube further comprises a chemical analyzer removably coupled to the gas outlet of the thermal desorption tube.

In one embodiment, the heater element of the thermal desorption tube is made of a metal having a resistivity higher than $4 \times 10^{-6}$ Ohm per centimeter.

In one embodiment, the heater element of the thermal desorption tube element is made of a metal such as nickel, tungsten, platinum, titanium, gold, iron, or nickel-iron alloy.

In one embodiment, the space between the heating element and the tube body of the thermal desorption tube is larger than 0.01 inch and smaller than 0.1 inch.

In one embodiment, the heating element of the thermal desorption tube has a cold resistance between 0.1 Ohm and 2 Ohm.

In one embodiment, the thermal desorption tube includes a power source that is a battery.

In another embodiment, a method of making a thermal desorption tube is disclosed. The method includes selecting a tube body having a tube wall, a tube first end portion, a tube second end portion, a tube middle portion, a gas inlet, and a gas outlet, selecting a heating element sized to fit within the tube body, wherein the heating element has a TCR value greater than 0.003 per degree Celsius, and wherein the heating element has a first element end and a second element end, disposing the heating element within the tube body between the gas inlet and the gas outlet such that a space is defined between the heating element and the tube body, configuring the first element end and the second element for electrical coupling to a power source, and packing a sorbent material within and around the heating element located within the tube middle portion of the tube body.

In one embodiment, the method further comprises packing a plug of glass wool, quartz wool, or metal mesh inside the tube first end portion and the tube second end portion adjacent the gas inlet and the gas outlet, respectively, around the first element end and the second element end of the thermal desorption tube.

In one embodiment, a thermal desorption tube packed with adsorbent material and having the embedded heating element is used for chemicals extraction from human breath and presenting them to a chemical analyzer. Chemicals collected and extracted from human breath and analyzed by chemical analyzer may be used for human health and body condition diagnosis.

DETAILED DESCRIPTION OF THE INVENTION

The invention is a thermal desorption tube with an embedded heater designed to be used with portable battery-powered field analyzers for chemicals in air analysis including, but not limited to, a Gas Chromatograph (GC), a Mass Spectrometer (MS), GC/MS, an Ion Mobility Spectrometer (IMS), Infrared Adsorption Spectrometers (FTIR, non-dispersive, TDLAS, etc.), and a Photoionization detector (PID).

Figure 1:
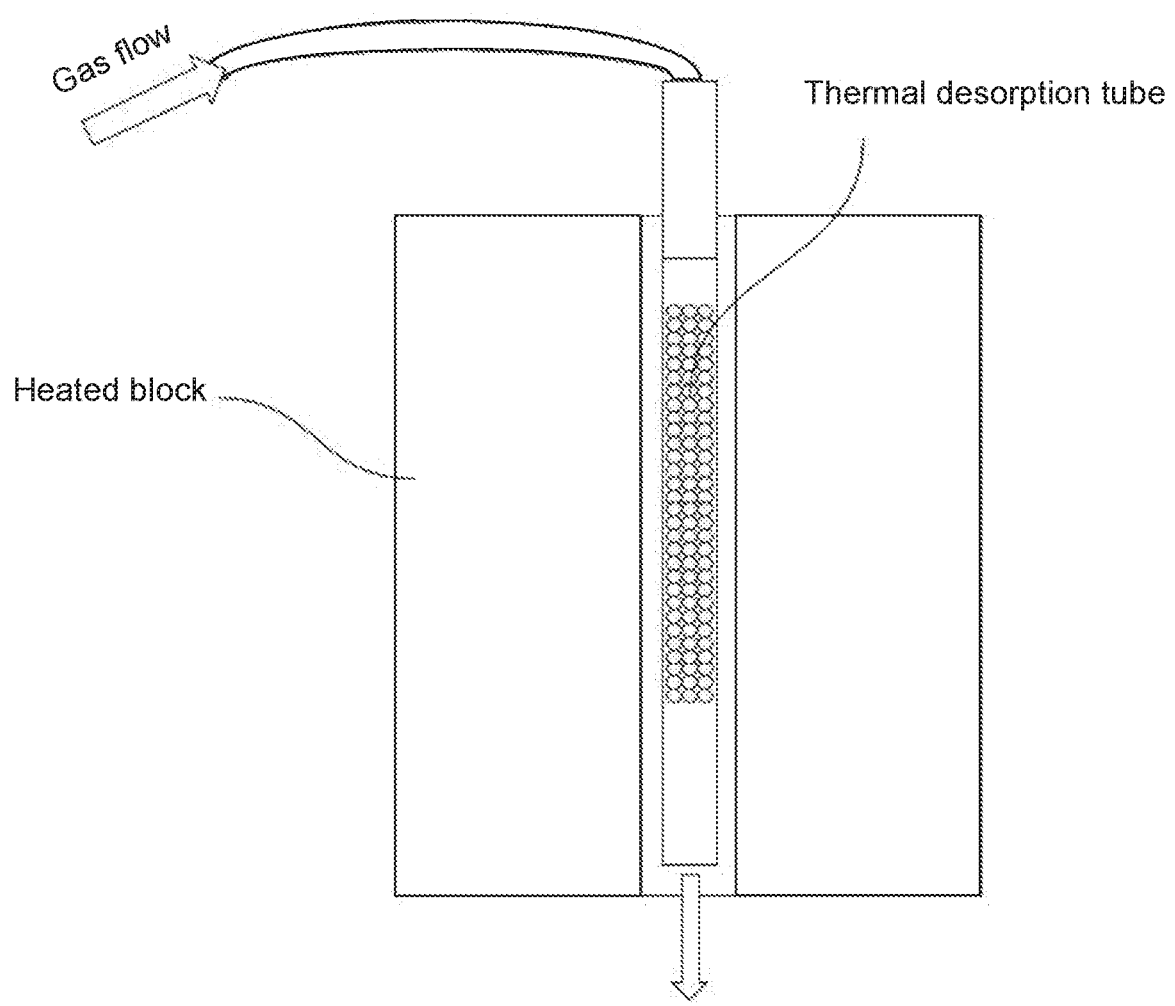
FIG. 1 is an illustrative example of a laboratory thermal desorber showing a desorption tube placed within a relatively large mass heater block.
Figure 2:
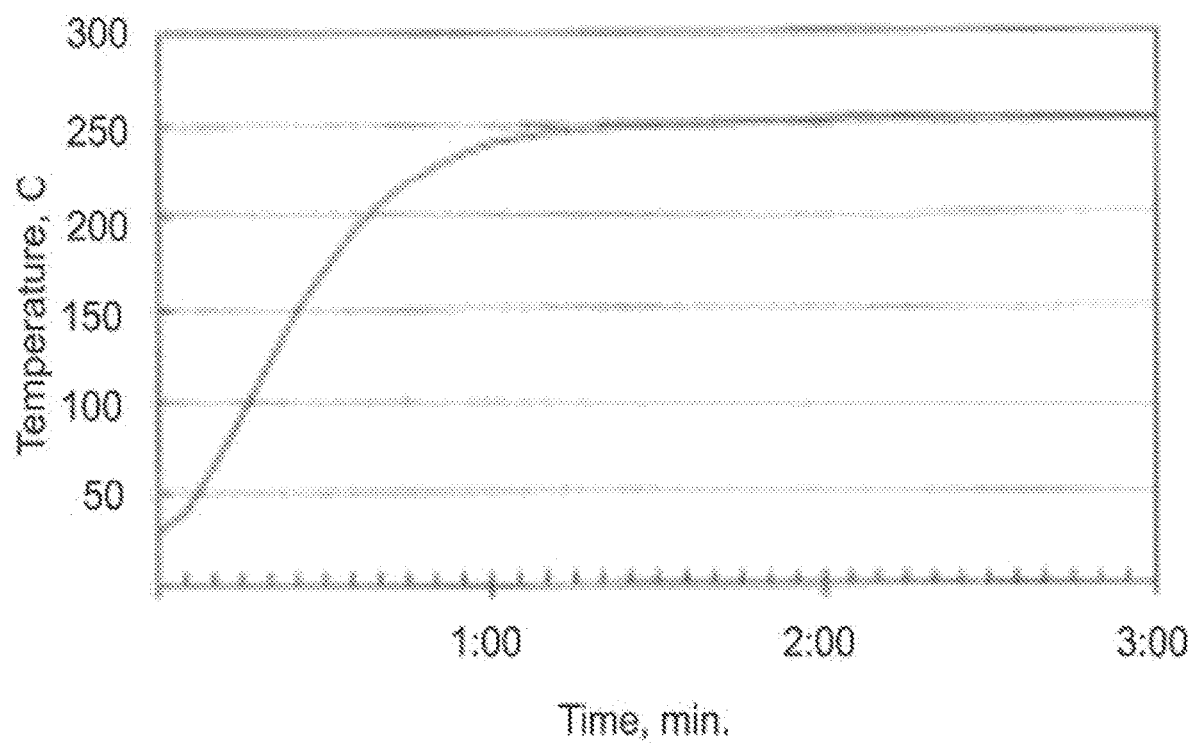
FIG. 2 illustrates a graphical representation of thermal desorption tube temperature as a function of time after placing the desorption tube in an oven heated to 250° C.
Figure 3:
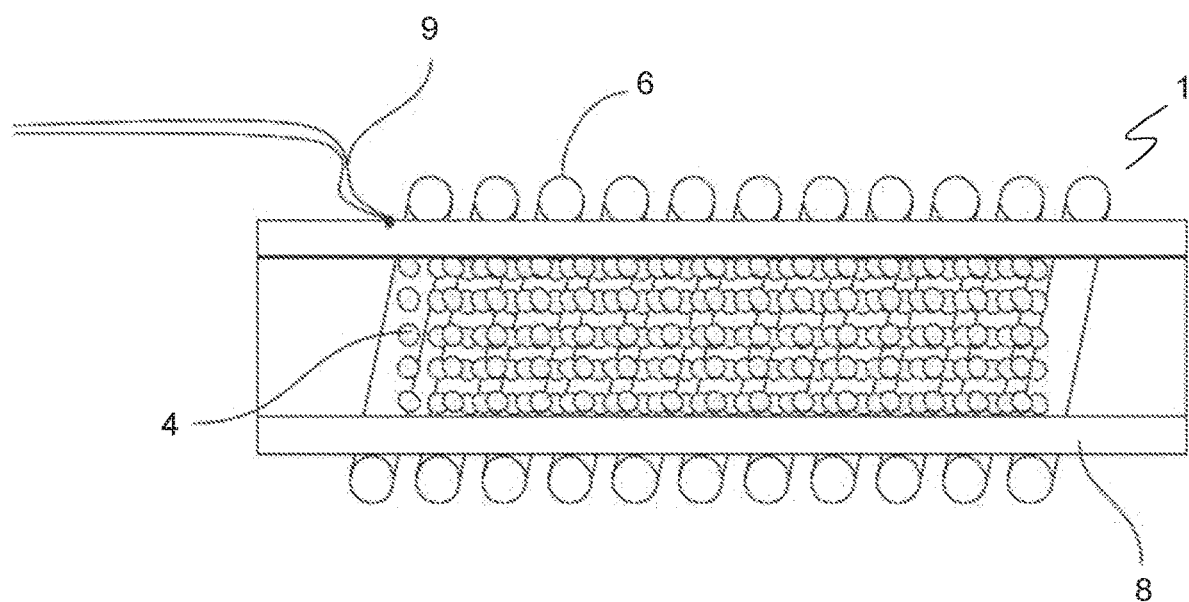
FIG. 3 is an illustrative example of a typical desorption tube configuration showing the resistive wire heater on the outside of the desorption tube with the sorbent material inside of the tube.
Figure 4:
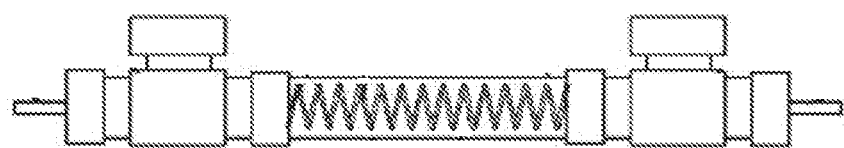
FIG. 4 is an illustrative example of a prior art desorption tube showing the resistive wire heater on the inside of the desorption tube where a coating of the sorbent material is deposited on the wire heater.
Figure 5:
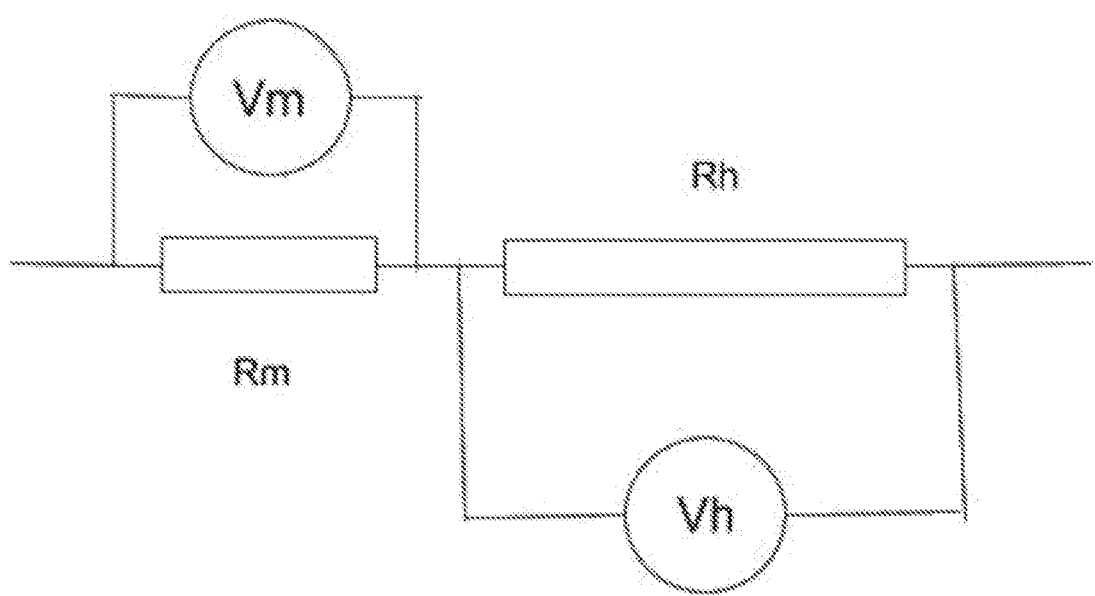
FIG. 5 is a graphical representation of voltage and resistance using the heater wire resistance to measure the temperature.
Figure 6:
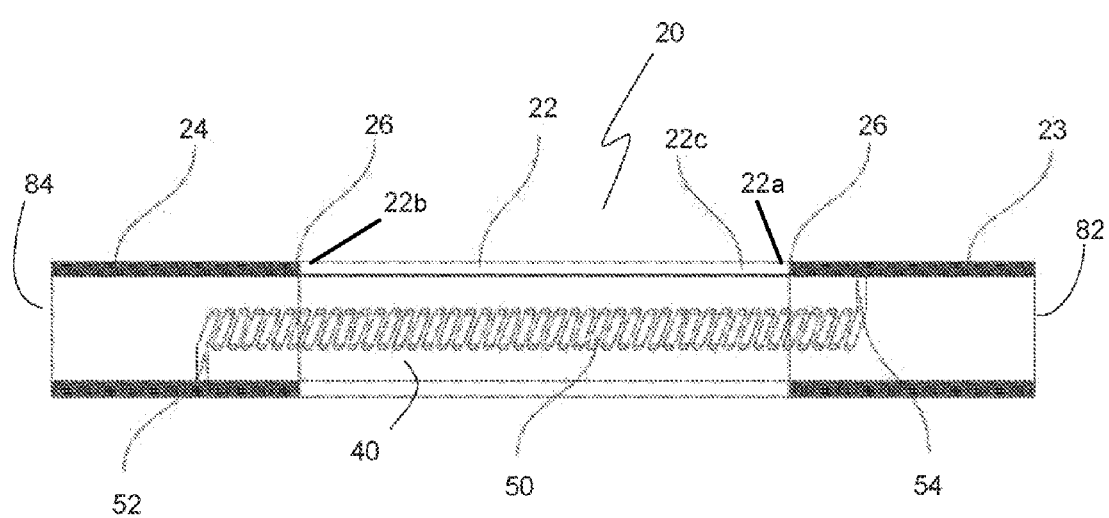
FIG. 6 illustrates one embodiment of a thermal desorption tube of the present invention showing a tube with a heater element within the tube where the heater element extends into the metal ends of the desorption tube.

FIG. 6 shows thermal desorption tube construction with an embedded heater element. The disclosed device is a thermal desorption tube 20 that includes a tube body 22 having a wall 22c, a tube first end portion 23, a tube second end portion 24, a tube middle portion 25, a gas inlet 82, a gas outlet 84, a heater element 50 disposed within tube body 22, and a sorbent material 60 within and surrounding heater element 50 that is within tube middle portion 25. In one embodiment, tube middle portion 25 is made of an electrically-insulating material such as a glass tube made of a borosilicate glass, a soda lime glass, or quartz. Instead of glass, the tube middle portion 25 may also be fabricated from a ceramic, for example alumina. In the previous embodiment, tube first end portion 23 and tube second end portion 24 are each a metal tube that is permanently attached to the tube middle portion 25 at each of tube middle portion ends 22a and 22b forming tube body 22. The metal tube may be attached to tube middle portion 25 by gluing, crimping, or soldering or through glass melting to generate a glass-to-metal seal 26 at tube middle portion ends 22a and 22b, which forms a hermetic seal. The metal tube may be fabricated from copper, a nickel-cobalt ferrous alloy such as the product sold under the trademark "Kovar," or stainless steel. Inside tube body 22 is positioned a heater element 50. Heater element 50 may be a coiled wire, a metal strip, or a metal ribbon.

Heater element 50 serves as a resistive heater and as a temperature measurement element. Precision sorbent material 60 temperature control by element resistance measurement can be realized only for elements fabricated from a material having a relatively large TCR value. The heater element 50 is constructed from a material having a TCR above 0.003 per degree Celsius, which corresponds to 3% resistance change for each 10° C. By selecting a heater element with a TCR value greater than 0.003 per degree Celsius, temperature control using heater element resistance becomes a visible and practical method. A list of materials for element fabrication that meets this requirement includes Nickel (TCR=0.006/° C.), Tungsten (TCR=0.0045/° C.), Platinum (TCR=0.004/° C.), Titanium (TCR=0.0038/° C.), Gold (TCR=0.0034/° C.), Iron (TCR=0.0056/° C.), and nickel-iron alloy (TCR=0.0045/° C.). The heater element 50 cold resistance of thermal desorption tube 20 is between 0.1 Ohm and 2 Ohms.

The length of heater element 50 between heater element ends 52 and 54 is longer than the length of tube body 22 and extends into each of tube first end portion 23 and tube second end portion 24. Heater element 50 is permanently attached at heater element ends 52 and 54 to each of tube first end portion 23 and tube second end portion 24, respectively. In the embodiment where tube first end portion 23 and tube second end portion 24 are made of metal and attached to tube body 22 that is nonmetal, heater element ends 52 and 54 are permanently attached by welding or by soldering making a permanent electrical contact 56. Heater element ends 52 and 54 are configured to electrically couple to a power source.

Figure 7:
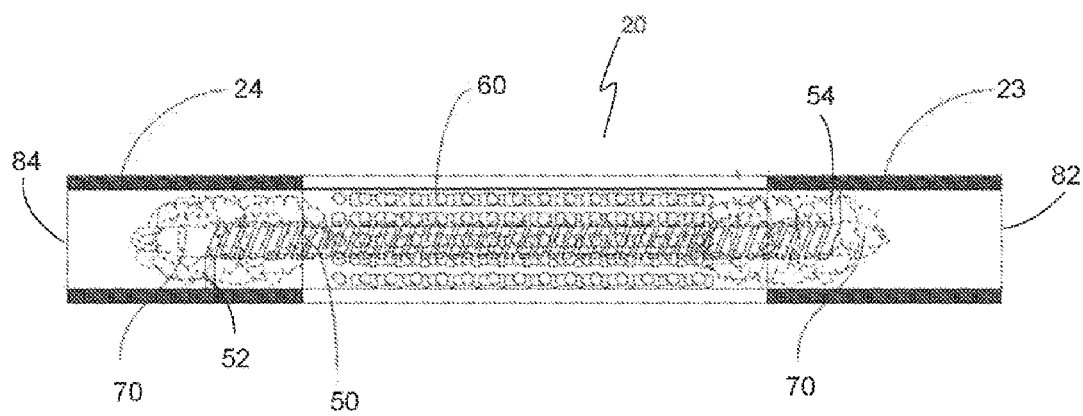
FIG. 7 illustrates one embodiment of a thermal desorption tube with embedded heater element showing packed sorbent material within the desorption tube and into the metal ends of the desorption tube.

Turning now to FIG. 7, an important feature of thermal desorption tube 20 is that heater element 50 does not touch tube body 22 and has a gap or space 40 between the heater element 50 and tube body 22. Gap 40 is larger than 0.01 inch and smaller than 0.1 inch. Gap 40 is filled with sorbent material 60. Sorbent material 60 is also packed inside of the element 50 coil. Sorbent material 60 is in a mesh particulate form. It may be a carbon-based adsorbent, a molecular sieve, or a porous polymer with high surface area. Examples of usable sorbent material 60 include, but are not limited to, a porous polymer resin sold under the trademark "Tenax," a carbon-based adsorbent sold under the trademark "Carbopack," and the like. To prevent sorbent material 60 from movement inside of thermal desorption tube 20, a plug 70 is placed inside tube first end portion 23 and tube second end portion 24 adjacent gas inlet 82 and gas outlet 84, respectively, around heater element ends 52 and 54 and adjacent portions of heater element 50 such that plugs 70 also contact sorbent material 60. Plugs 70 are constructed from glass wool, quartz wool, or metal mesh.

Figure 8:
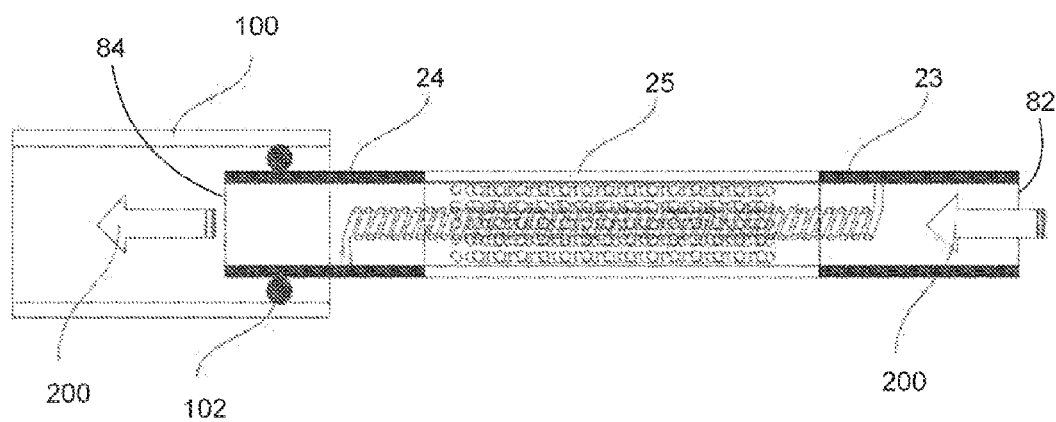
FIG. 8 illustrates another embodiment of a thermal desorption tube of the present invention showing the gas outlet connected to a chemical detector receiving port.

As illustrated in FIG. 8, during operation, one end (i.e., the gas inlet 82) of the device is open for the flow of sample air or gas, and an opposite end (i.e., the gas outlet 84) is connected to a chemical analyzer 100 through a seal 102. Air flow through the sorbent material 60 as indicated by arrow 200 is provided by an air pump of the chemical analyzer 100. In one embodiment, seal 102 is an O-ring-based, for example, push-to-connect seal. Also, seal 102 can be a metal-to-metal compression seal.

Figure 9:
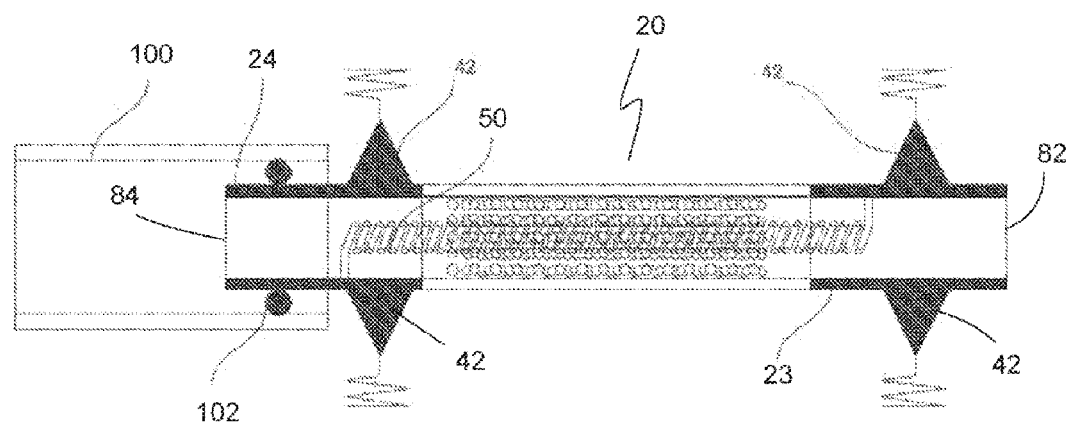
FIG. 9 illustrates another embodiment of a thermal desorption tube of the present invention showing thermal desorption tube electrical couplings.

FIG. 9 illustrates another embodiment of the present invention showing one alternative for establishing electrical coupling to heater element ends 52 and 54. In the embodiment where tube middle portion 25 is non-metal and tube first end portion 23 and tube second end portion 24 are metal, the electrical coupling is a spring-loaded contact 42. Such an arrangement provides the ability to replace tubes with sorbents in the field without additional tools.

Figure 10:
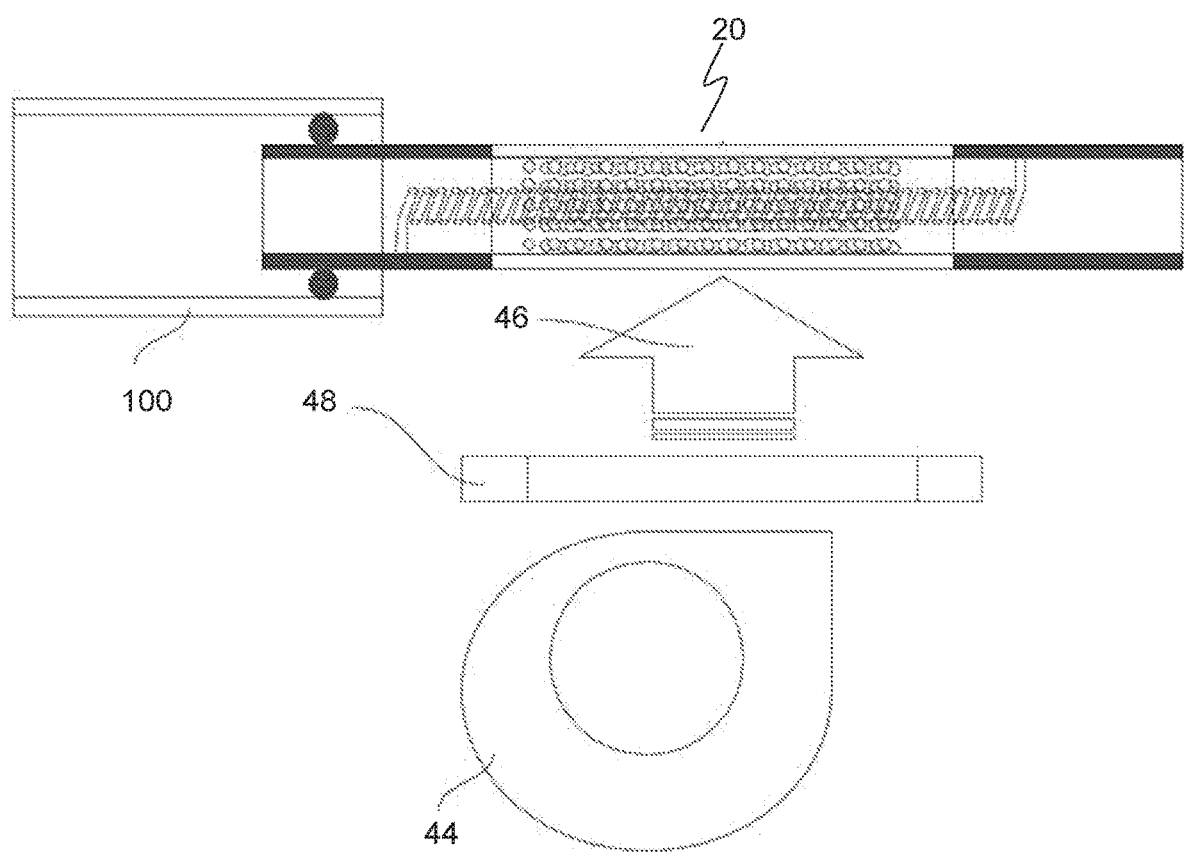
FIG. 10 illustrates the thermal desorption tube of FIG. 8 showing a cool air blower.

A sorbent material 60's performance in collecting and concentrating chemicals depends on the temperature of the sorbent material 60. To reduce time delay associated with cooling of the sorbent material 60, enhanced cooling may be accomplished by using an air blower 44 as shown in FIG. 10. Air blower 44 is positioned within the vicinity of thermal desorption tube 20. In one embodiment, air flux 46 created by air blower 44 delivers typically ambient temperature but can be reduced by placing a cooling object 48 with a temperature below the environment in a pathway of the air flux 46. The cooling object 48 may be a thermoelectric cooler that relies on the Peltier effect.

Figure 11:
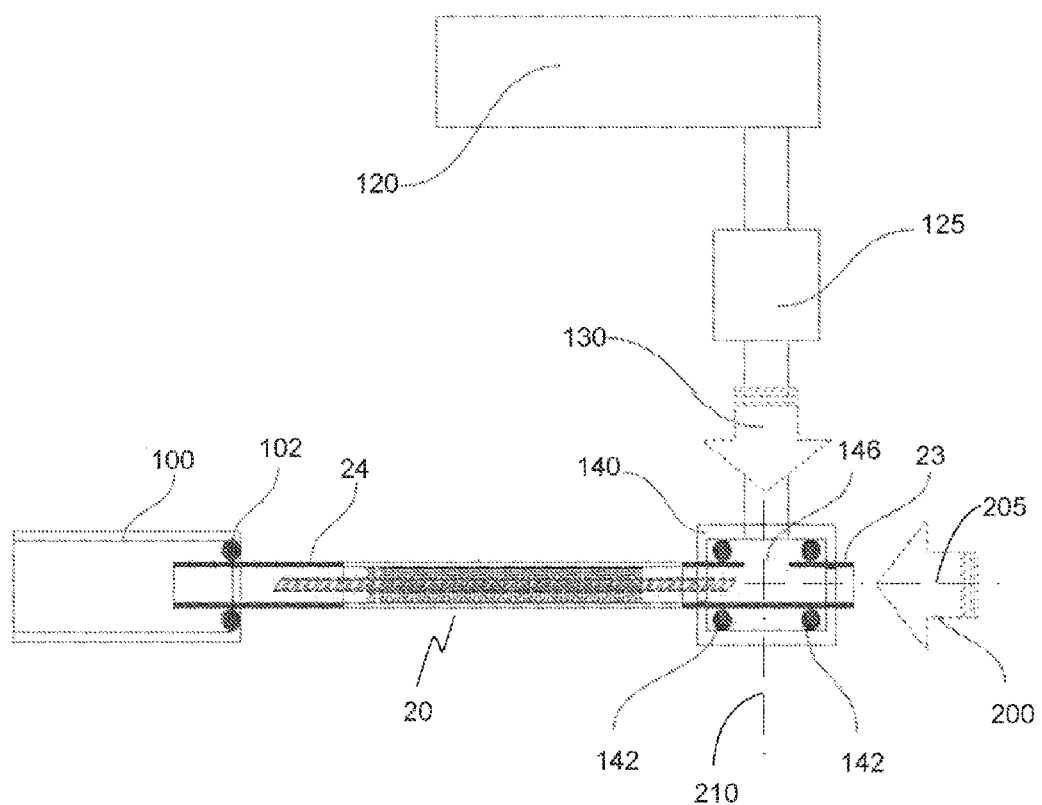
FIG. 11 illustrates another embodiment of the present invention showing a thermal desorption tube with a calibrant structure connected to the gas inlet of the thermal desorption tube.

Turning now to FIG. 11, there is illustrated a thermal desorption tube 20 to provide quantitative chemical analysis in combination with a calibrant source 120 providing a known amount air flow 56 with a known concentration of a calibrant chemical. After a known amount of chemical is injected into the thermal desorption tube 20, the thermal desorption tube 20 is heated in a controlled manner to a specified temperature to thermally desorb the calibrant chemical collected by sorbent material 60. The desorbed calibrant chemical is then injected into the chemical analyzer 100. The chemical analyzer 100 response to the known amount of calibrant chemical is recorded. The ratio between the amount of the calibrant chemical injected into thermal desorption tube 20 and chemical analyzer 100 response is used to adjust (i.e., calibrate) the chemical detector reading after sampling, sorption-desorption, and analysis of a sample with unknown concentration.

In one embodiment, between thermal desorption tube 20 and calibrant source 120 is placed a normally closed valve 125. When closed, valve 125 prevents calibrant flow 130 into thermal desorption tube 20. When valve 125 is open, the calibrant chemical can flow into thermal desorption tube 20.

In one embodiment, the output of the calibrant module 120 during the calibration process may be manually connected to thermal desorption tube 20 using a flexible tubing.

Thermal desorption tube 20 may be connected to calibrant source 120 through a connection interface 140 mounted with sealing O-rings 142. One of tube first end portion 23 or tube second end portion 24 of thermal desorption tube 20 may have one or more input openings 146 where the input openings 146 have an axis 210 perpendicular to the thermal desorption tube axis 205.

In one embodiment, the thermal desorption tube 20 has a heater but does not have any sorbent material 60. In such a case, solid samples may be placed directly inside the thermal desorption tube 20 and thermally extracted without the use of any sorbent material 60.

In another embodiment, thermal desorption tube 20 is pre-filled with a chemical that can be used as a calibrant chemical to provide injection of a known amount of known chemical into the chemical analyzer 100.

Thermal desorption tube 20 with embedded heater 50 may be used in combination with a handheld analyzer device having a battery, microprocessor, electrical circuitry, air pump or a number of pumps, pneumatic valve, display, and means to start/stop air sampling with a specified airflow and to set temperature for chemical thermal desorption.

In another embodiment, a temperature and air flow module having a temperature controller and means to control air flow through the thermal desorption tube 20, means to control sorbent material 60 temperature by applying electrical power, and means for measurement of element temperature by resistance measurement may be integrated with a chemical analyzer 100.

Figure 12:
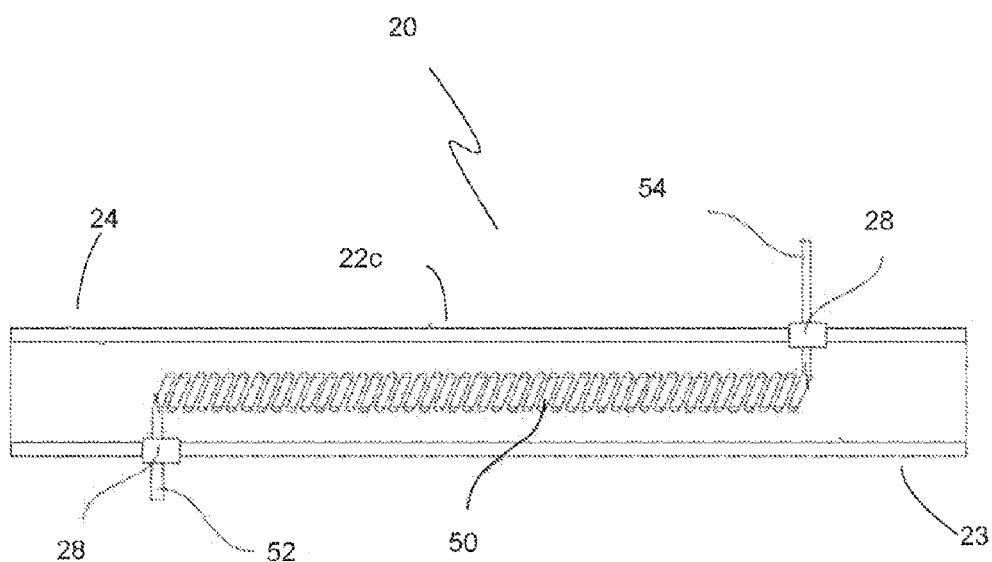
FIG. 12 illustrates another embodiment of a thermal desorption tube of the present invention where the tube is made entirely of metal.

Turning now to FIG. 12 illustrates another embodiment where the thermal desorption tube 20 is made entirely of metal and heater element 50 is positioned inside of the thermal desorption tube 20 in a manner similar to that shown in FIG. 6, however, without electrical contact with the tube first end portion 23 and tube second end portion 24 of thermal desorption tube 20. An electrically insulating feedthrough 28 disposed in a wall 22c provides electrical insulation between heater element ends 52, 54 and tube first end portion 23 and tube second end portion 24. In this embodiment, heater element ends 52, 54 extend through tube first end portion 23 and tube second end portion 24, respectively, and are electrically coupled to the power supply having a controller. The metal used for the tube body 22, tube first end portion 23, and second tube end portion 24 is made from copper, bronze, stainless steel, or a nickel-cobalt ferrous alloy sold under the trademark "Kovar."

Figure 13:
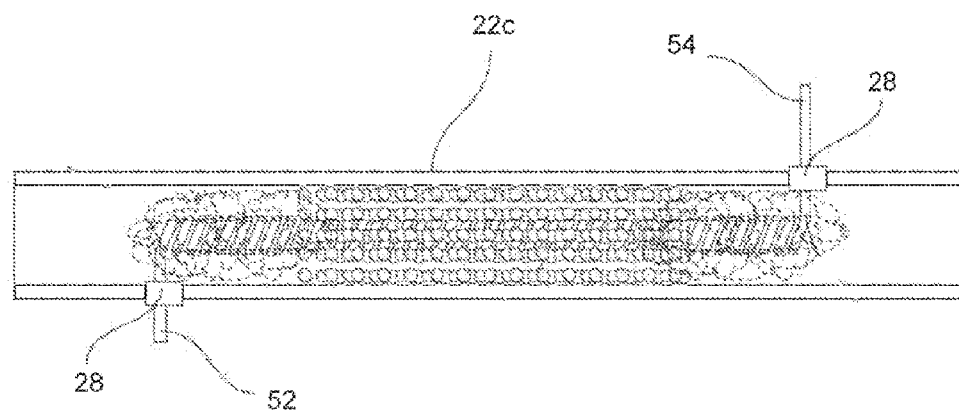
FIG. 13 illustrates the embodiment of a thermal desorption tube of FIG. 12 showing sorbent material disposed within the desorption tube.

FIG. 13 illustrates an embodiment where thermal desorption tube 20 is made entirely of a metal previously described with heater element 50 positioned inside of the thermal desorption tube 20 without electrical contact with the walls of the tube. The thermal desorption tube 20 as previously described is packaged with sorbent material 60 and plugs 70 to prevent sorbent material 60 from movement.

Figure 14:
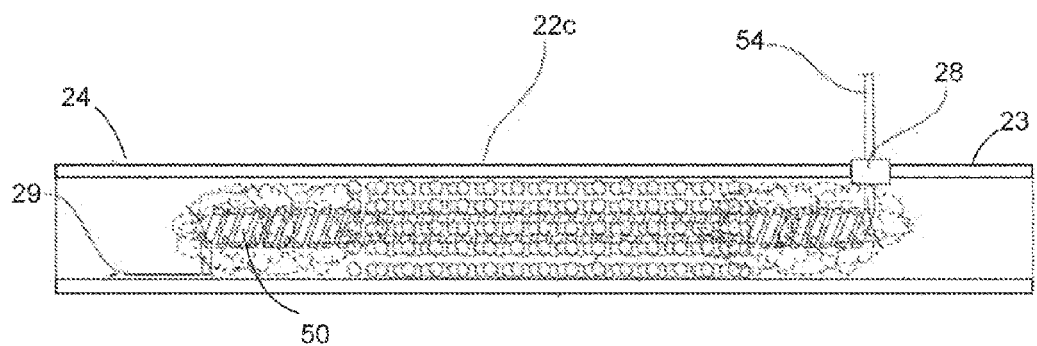
FIG. 14 illustrates another embodiment of a metal thermal desorption tube showing one side of a heater element electrically coupled to the metal tube.

FIG. 14 illustrates another embodiment where one of the heater element ends 52, 54 is electrically coupled to one of the tube first end portion 23 or the tube second end portion 24 making electrical contact as indicated by reference number 29 with the thermal desorption tube 20 while the other extends through electrically insulating feedthrough 28. The tube can have a ground potential. In this case, the electrical current will flow from the heater element end 54 through the heating element 50 to the grounded thermal desorption tube 20.

Figure 15:
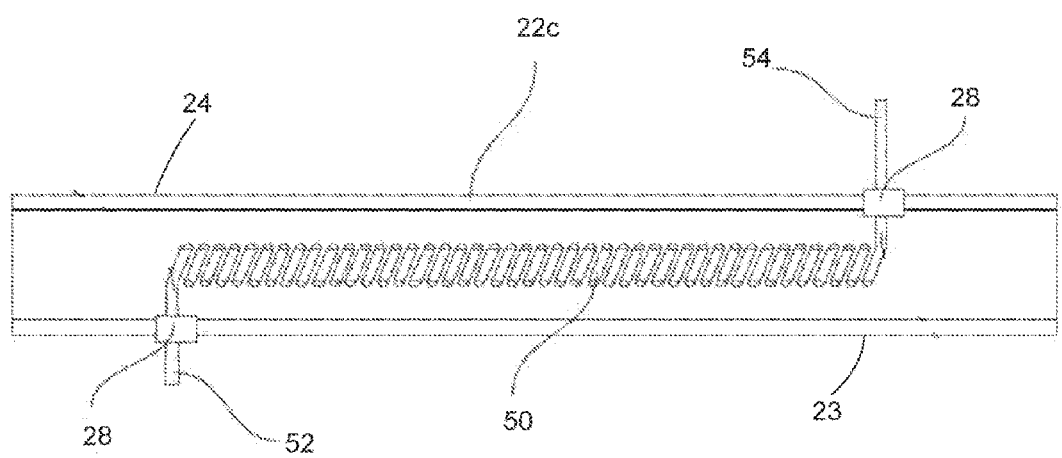
FIG. 15 illustrates another embodiment of the present invention showing a glass or ceramic thermal desorption tube with electrical feedthrough.

FIG. 15 illustrates another embodiment of the present invention where tube body 22, tube first end portion 23, and tube second end portion 24 are constructed entirely from an electrically-insulating material such as glass, quartz, or ceramics. It may also be alumina ceramics. Heater element ends 52, 54 extend from the inside of thermal desorption tube 20 to the outside of thermal desorption tube 20 through a feedthrough 38, which can be a glass or a ceramic-based adhesive, to provide electrical power to heater element 50.

Figure 16:
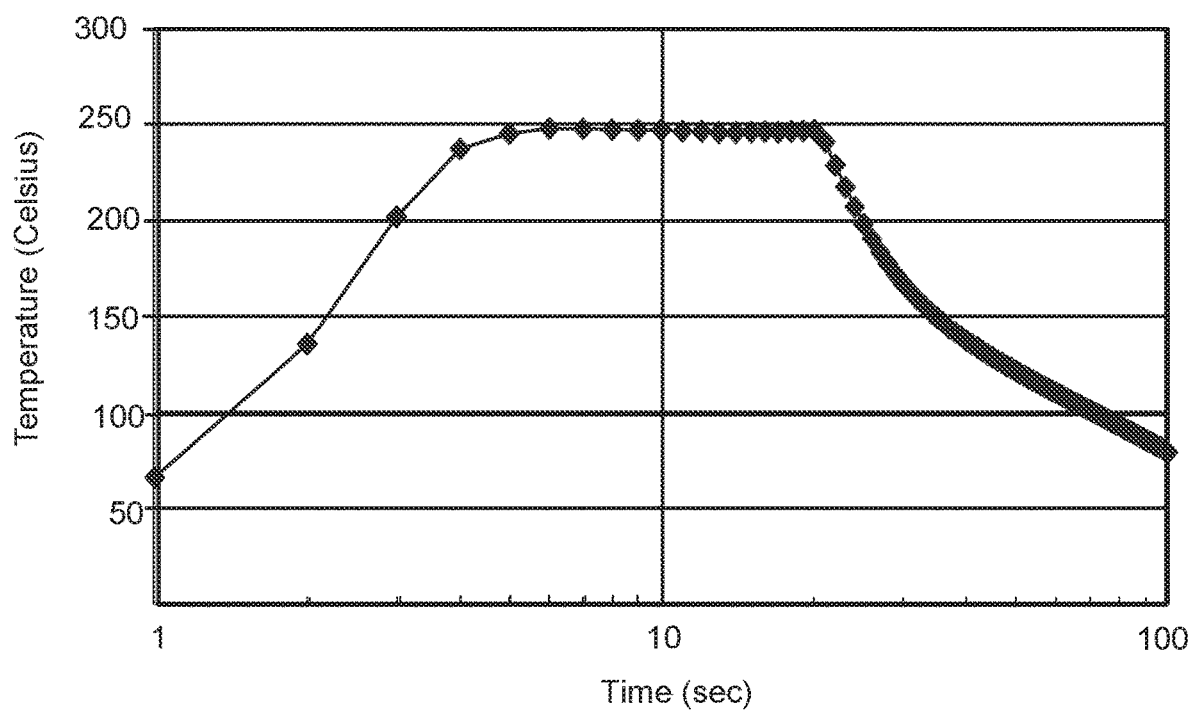
FIG. 16 is a graphical representation of measured sorbent temperature as a function of time using a thermal desorption tube of the present invention with an embedded heater.

FIG. 16 is a graphical representation of measured sorbent temperature as a function of time using a thermal desorption tube 20 with an outside diameter equal to 0.25 inch, a tube body 22 made of glass and having a length equal to 2", a tube first end portion 23 and a tube second end portion 24 made of metal where each tube end portion has a length of 0.75", a nickel element wire having a resistance of 0.2 Ohm as the heater element 50, an applied battery voltage of 3.7V, and the tube was packed with Tenax sorbent material 60 with a mass of 0.2 g. The sorbent material 60 was heated to 250° C. within 5 sec.

Figure 17:
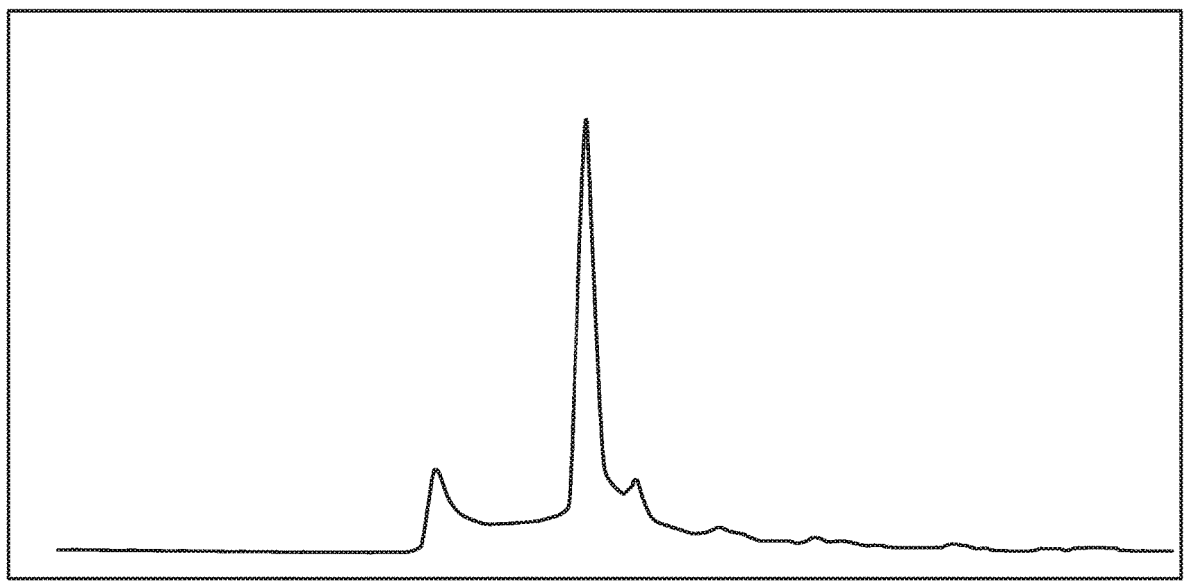
FIG. 17 is a graphical representation showing an ion mobility spectrometer (IMS) spectrum of low concentration lidocaine vapors without the use of concentrator.

FIG. 17 shows Ion Mobility Spectrometer (IMS) detector plasmagram of air collected from a jar with an amount of lidocaine in air that is not detectable by the spectrometer.

Figure 18:
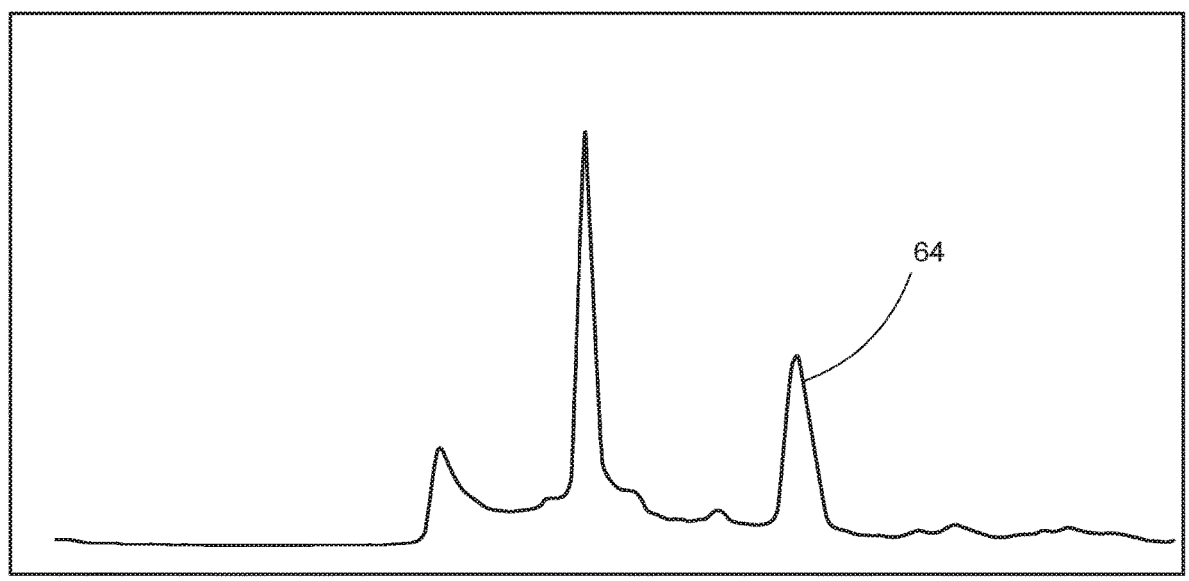
FIG. 18 is a graphical representation showing an IMS spectrum of pre-concentration lidocaine vapors obtained with the use of a thermal desorption tube of the present invention with an embedded heater element.

Air from the same jar with lidocaine was pumped through the thermal desorption tube 20 packed with Tenax sorbent material 60. After sample collection, the thermal desorption tube 20 was heated to 300° C. and the released chemicals injected into an IMS detector. FIG. 18 shows a plasmagram with a strong response at reference no. 64 to the concentrated lidocaine.

Figure 19:
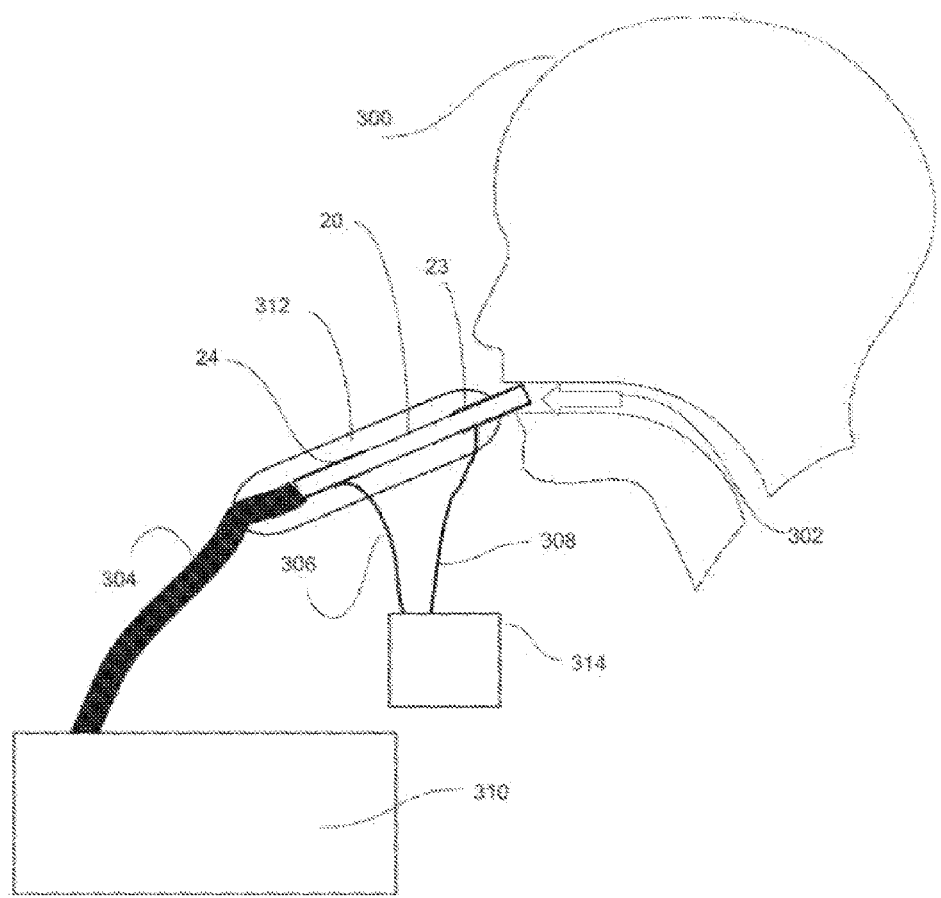
FIG. 19 is an illustration of another embodiment of the present invention showing the thermal desorption tube being used as part of a breathalyzer.

Turning now to FIG. 19, thermal desorption tube 20 packed with adsorbent material and having an embedded heating element is used for chemicals extraction from human breath 302 of a human 300 and presenting them to chemical analyzer 310. Chemicals collected/extracted from human breath 302 and analyzed by chemical analyzer 310 can be used for human health and body condition diagnosis. Thermal desorption tube 20 is mounted in a tube holder 312 having electrical connectors to the tube second end portion 24 and tube first end portion 23. One end of thermal desorption tube 20 is connected to a hose/conduit 304. The hose/conduit 304 provides flow of desorbed chemicals from thermal desorption tube 20 to the chemical analyzer 310. The chemical analyzer 310 may be a Gas Chromatograph (GC), a Mass Spectrometer (MS), an Ion Mobility Spectrometer (IMS), an Infrared Light Adsorption Optical Spectrometer (IR), or a device combining those techniques GC/MS, GC/IMS, GC/IR. Tube holder 312 has electrical contacts coupled to the embedded heater 50. Cables 306 and 308 connect thermal desorption tube 20 to an electrical controller 314. Electrical controller 314 is used for heating desorption tube 20 and for precision temperature control of adsorbent material. Such configuration makes it possible to collect chemicals from human breath 302, pre-concentrate them, and release to the chemical analyzer 310 through hose/conduit 304. Collected sample release is performed in several steps with a sorbent temperature increase at each subsequent step. By performing the release in several steps, it is possible to desorb and separate moisture from the collected sample before presenting it to the chemical analyzer 310.

Device operation comprises a number of steps. In step 1, thermal desorption tube 20 is connected to a device having an air pump through an air-tight interface. A known amount of air with a known air flow is passed through the sorbent material 60 for a predefined period of time to absorb one or more chemical species in the air. In the next step, electrical power is applied to the heater element 50 to a preset temperature. Electrical power applied between heater element ends 52, 54 is released as heat from heater element 50. The released heat is transferred to the sorbent material 60.

The temperature is measured by measuring the resistance of heater element 50. The air pump provides flow of the thermally desorbed chemical(s) from the sorbent material 60 into the chemical analyzer 100.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A thermal desorption tube comprising:
   a tube body having a tube wall, a tube first end portion, a tube second end portion, a tube middle portion, a gas inlet disposed in the tube first end portion, and a gas outlet disposed in the tube second end portion;
   a heating element having a first element end and a second element end, wherein the heating element is disposed within the tube body between the gas inlet and the gas outlet, wherein a space is defined between the heating element and the tube body, wherein the heating element is made of a metal having a temperature coefficient of resistance (TCR) value greater than 0.003 per degree Celsius, and wherein the first element end and the second element end are configured to electrically couple to an electrical power source; and
   a sorbent material disposed within and around the heating element located within the tube middle portion of the tube body, wherein the sorbent material is disposed in and occupies all the space defined between the heating element and the tube body, and wherein the sorbent material is in direct contact with the heating element.

2. The thermal desorption tube of claim 1 further comprising a plug disposed inside the tube first end portion and the tube second end portion adjacent the gas inlet and the gas outlet, respectively, around the heating element ends, and adjacent portions of the heater element.

3. The thermal desorption tube of claim 1, wherein the tube middle portion is made of an electrically-insulating material, wherein the tube first end portion and the tube second end portion are made of an electrically-conducting material, and wherein the first element end is electrically coupled to the tube first end portion and the second element end is electrically coupled to the tube second end portion.

4. The thermal desorption tube of claim 1, wherein the tube body is entirely made of an electrically-insulating material, and wherein the first element end extends through the tube first end portion and the second element end extends through the tube second end portion.

5. The thermal desorption tube of claim 1, wherein the tube body is entirely made of an electrically-conducting material, and wherein the first element end and the second element end each extend through a non-electrically conductive feedthrough disposed in the wall of the tube body.

6. The thermal desorption tube of claim 1, wherein the tube body is entirely made of an electrically-conducting material, and wherein the first element end extends through a non-electrically conductive feedthrough disposed in the wall of the tube body and the second element end is electrically coupled to the tube body.

7. The thermal desorption tube of claim 1 further comprising an air blower adjacent the tube middle portion and positioned to deliver an air flux across the tube middle portion.

8. The thermal desorption tube of claim 7 further comprising a thermoelectric cooler positioned within the air flux between the air blower and the tube middle portion.

9. The thermal desorption tube of claim 1, wherein the tube middle portion is made of glass, quartz, or ceramics, and wherein the glass is a borosilicate glass or a soda lime glass.

10. The thermal desorption tube of claim 1, wherein the tube first end portion and the tube second end portion are made of a metal selected from the group consisting of copper, nickel-cobalt ferrous alloy, and stainless steel.

11. The thermal desorption tube of claim 1 further comprising a spring-loaded electrical power source contact disposed adjacent one or both of the first element end and the second element end of the heating element.

12. The thermal desorption tube of claim 1 further comprising a calibrant source containing a known concentration of a calibrant chemical removably coupled to the gas inlet.

13. The thermal desorption tube of claim 1 further comprising a chemical analyzer removably coupled to the gas outlet.

14. The thermal desorption tube of claim 1, wherein the heating element is made of a metal having a resistivity higher than $4\times10^{-6}$ Ohm per centimeter.

15. The thermal desorption tube of claim 1, wherein the heating element is made of a metal selected from the group consisting of nickel, tungsten, platinum, titanium, gold, iron, and nickel-iron alloy.

16. The thermal desorption tube of claim 1, wherein the space between the heating element and the tube body is larger than 0.01 inch and smaller than 0.1 inch.

17. The thermal desorption tube of claim 1, wherein the heating element has a cold resistance between 0.1 Ohm and 2 Ohm.

18. The thermal desorption tube of claim 1, wherein the electrical power source is a battery.

19. A method of making a thermal desorption tube, the method comprising:
   selecting a tube body having a tube wall, a tube first end portion, a tube second end portion, a tube middle portion, a gas inlet disposed in the tube first end portion, and a gas outlet disposed in the tube second end portion;
   selecting a heating element sized to fit within the tube body wherein the heating element has a temperature coefficient of resistance (TCR) value greater than 0.003 per degree Celsius, and wherein the heating element has a first element end and a second element end;
   disposing the heating element within the tube body between the gas inlet and the gas outlet such that a space is defined between the heating element and the tube body;
   configuring the first element end and the second element end for electrical coupling to an electrical power source; and
   packing a sorbent material within and around the heating element located within the tube middle portion of the tube body, wherein the sorbent material is disposed in and occupies all the space defined between the heating element and the tube body, and wherein the sorbent material is in direct contact with the heating element.

20. The method of claim 19 further comprising packing a plug of glass wool, quartz wool, or metal mesh inside the tube first end portion and the tube second end portion adjacent the gas inlet and the gas outlet, respectively, around the first element end and the second element end.

* * * * *